3,120,445
AGRICULTURAL SPRAY
Donald Aluisi, 1269 E. Copper, and James R. Aluisi, 1505 E. Copper, both of Fresno, Calif.
No Drawing. Filed Dec. 8, 1961, Ser. No. 158,648
3 Claims. (Cl. 106—286)

The present invention relates to an agricultural spray and more particularly to a temperature control spray which forms a protective coating about the fruit, foliage, limbs, and trunks of growing crops and which is effective as a barrier against the transfer of heat into and out of such crops during high and low temperature extremes without impairing normal growth.

A great amount of damage is caused by the intense heat of the sun even in temperate and subtropical areas in the sunburning of leaves, limbs and fruit of growing crops. Certain varieties of trees, such as those of walnuts, peaches, citrus fruit and the like are particularly subject to sunburn. In many such areas, the heat of the sun is frequently sufficiently strong to kill the branches as well as the sides of the trunks exposed to the direct rays of the sun. Such damage results in a substantial loss of tree vitality with a corresponding loss of crop producing capability. For example, it is not unusual as far north as the thirty fifth parallel for peach and walnut trees to have the sides of their limbs completely deadened following exposure to direct sunlight from the south or west. In many instances the resultant impairment of production amounts to one-half or more of the productive potential of the trees.

Conversely, in the more temperature zones, short periods of frost frequently damage the crops and prolonged periods of low temperatures have killed entire trees and orchards. Nevertheless, transportation costs have caused citrus, avocado, and other subtropical crops to be grown in cooler climates than that of their natural habitats, so as to be closer to large markets, with concomitant hazard to crops and trees. The use of smudge pots, air circulating fans and water flooding procedures have been known for inhibiting damage to fruit and to fruit trees from low temperatures. Their effects have been difficult to localize and while of limited advantage, they have not sufficiently reduced frost damage. Smudge pots are not permitted everywhere because of atmospheric contamination resulting from their use. They tend to reduce crop quality because of their soiling effect. Circulating fans depend upon temperature inversion for their results. If the environmental weather does not provide such an inversion, they do not provide crop protection. Both smudge pots and circulating fans require substantial investments and are utilized only spasmodically. While flooding is frequently helpful, the low temperatures must be anticipated sufficiently to prepare the ground surface. Excessive water is harmful to many crops. If low temperatures occur on successive nights, the problems of excessive water are aggravated.

It is known that if minimum field or orchard temperatures can be raised only a degree or so or if the duration of the minimum temperatures can be reduced even moderately, many crops can be saved. Similarly, even slight lowering of the maximum temperatures or radiant heat or reduction of the duration thereof minimizes burning.

It is therefore an object of the present invention to provide a temperature control spray for agricultural crops providing a coating which effectively minimizes damage incident to temperature extremes.

Another object is to provide a temperature control spray for agricultural crops which provides a protective coating for such crops and which is sufficiently porous to permit continuance of normal plant growth.

Another object is to provide such a temperature control spray having sufficient film strength when applied to form a barrier against the transfer of heat into or out of the crop by conduction, convection and radiation.

Other objects are to provide such a temperature control spray which as a result of its application increases plant vigor, somewhat reduces irrigation requirements, facilitates proper ripening, and repels certain insects harmful to the crops.

Other objects and advantages will become more fully apparent upon reference to the following description in the specification.

The broad essence of the present invention resides in the discovery that the foregoing objects can be attained by the intimate mixture in the proper proportions of a primary light and heat reflective material, an adhesive or binding agent, and a clay bulking agent capable of imparting porosity to the mixture when it is applied in a water spray and subsequently dehydrated to form a plant cover. As will subsequently become apparent, the bulking agent is clay and is preferably two different clays having somewhat different characteristics.

The primary light and heat reflective material is hydrated lime, $Ca(OH)_2$. Being white, it is an excellent light and heat reflector. It also has the desirable property of being a fungicide so as to control blight which is usually encouraged by water sprays. It also discourages plant mites. However, if used in excess, the lime tends to impart chemical burning characteristics to the mixture and to cause the mixture to flake off when it has dried on the plants. Its upper limit of utilization in the material is regarded to be thirty-three and one third percent (33⅓%) by weight and its lower limit fifteen percent (15%) by weight of the dry mixed materials.

The binding agent is bentonite, a sodium montmorillonite, a well-known clay of the Pacific Coast States, which swells when wetted and has strong absorbing properties. Generally, bentonite consists of from 54% to 69% silica, 13% to 18% alumina, 2% to 4% ferric oxide, 0.12% to 3.5% ferrous oxide, 1.0% to 2.2% lime, 1.8% to 3.6% magnesia, 0.1% to 0.6% titania, 0.5% to 2.0% soda, and 0.14% to 0.46% potash. The highly colloidal bentonites contain the higher percentages of soda and have the higher absorbing properties. The lime and bentonite coact when applied in a water spray to achieve an excellent film strength. Not less than fifteen percent (15%) nor more than fifty percent (50%) by weight of bentonite is utilized. Used in excess, the ultimate film is insufficiently porous and provides a shelter for mites. While employed primarily as a sticking agent in the mixture of the present invention, it is also light in color to reflect light and heat and has certain of the trace elements which are valuable to plant life.

The clay bulking agent is kaolin, $Al_2O_3 \cdot 2H_2O \cdot 2SiO_2$, and/or Celite. Preferably both are employed. The former is a native aluminum silicate powder which is inert. The latter is a well-known uncalcined diatomaceous earth product frequently used for filter aids, fillers, insulating plasters and the like. The average analysis on a dry basis of the Celite is:

| | Percent |
|---|---|
| Silicon dioxide | 89 |
| Alumina | 3.7 |
| Ferric oxide | 1.5 |
| Titanium dioxide | 0.1 |
| Calcium oxide | 0.4 |
| Magnesium oxide | 0.7 |
| Alkalis sodium monoxide | 0.8 |
| Ignition loss consisting of water, carbon dioxide and organics | 3.7 |

The specific gravity of the Celite is in the range of from 2.0 to 2.3; particle size, one to 100 microns, and the bulk density 8 to 10 pounds per cubic foot dry, and 15.28 pounds per cubic foot wet. Celite like kaolin is inert to most chemicals, is light in color so as to facilitate light and heat reflection, imparts porosity to the ultimate film on the plant, and is an excellent insulator. The total kaolin and the celite constituents are usually employed in the range of from twenty percent (20%) to sixty-five percent (65%) by dry weight of the mixture of the instant invention. An exception is in sprays for melons in which the bentonite is omitted and 85% of the kaolin and Celite are employed with 15% lime.

In all sprays resulting from variations of the above percentage ranges, it is imperative that the following proportions based upon dry weight be observed. In the case of hydrated lime, it should constitute from 15% to 33⅓% of the dry weight of the spray mixture before the addition of the water; the remaining portion of the dry mixture is selected from a group of clays having silicon dioxide and alumina as their primary constituents so that the balance of the spray mixture consists of silicon dioxide in the range of 54% to 89% and alumina in the range of 13% to 45%.

The above described lime, bentonite and clays are preferably intermixed with water at the rate of 60 pounds of such dry elements with 100 gallons of water as a spray carrier. For optimum coverage and protection, the elements are preferably utilized in the following percentages by weight:

| | Percent |
|---|---|
| Lime | 20 |
| Bentonite | 40 |
| Kaolin | 20 |
| Celite | 20 |

After application in water spray, such mixture provides a covering film having an almost white appearance for the optimum reflective purposes which is highly resistant to flaking and provides good resistance to mites and other insects. It achieves good coverage and protection even where the water carrier contains as much as 400 parts per million of salt, as it does in some of the irrigation waters of the western part of the United States. It has been found that after 30 days such mixture provides as much as 75% coverage. Furthermore, such covering is highly resistant to being washed away by rain. The film covering provides excellent temperature protection and is sufficiently porous that continued plant growth is uninhibited. Another example mixture of the present invention which has been found effective for certain specific uses omits the Celite clay constituent and utilizes kaolin. Although successful in vineyards, it does not have the durability of the first example mixture. This mixture contains one-third by weight each of lime, bentonite, and kaolin. In use, care must be taken when applying this mixture as it has a tendency to flake when applied too heavily in areas where the water supply has a relatively high salt content.

The most prolonged coverage has been found to be provided by a mixture containing 50% bentonite, 35% kaolin and 15% lime. Such mixture is excellently suited to windy areas although its mite repelling characteristics are not as good as the previously described mixtures.

When mixed with water in the manner described and applied to growing crops, the above mixtures dry to form an insulating light and heat reflective film which is highly effective in accomplishing its intended purposes. Being virtually white, it reflects direct rays of the sun and obviates or minimizes sunburn of leaves, fruit, limbs and trunks of the crops. In areas of the San Joaquin Valley of California where the limbs of walnut trees are usually killed where exposed to direct sunlight, thus resulting in "half limbs," the sprays of the present invention have made it possible to avoid such half limb destruction and to permit walnut trees to be grown with entirely sound limbs. The same has been true of peach trees. The sprays have also made it possible to avoid or minimize the sunburning of the trees and crops of plums, peaches, apricots, oranges, grapefruit, grapes, walnuts, and other fruits and nuts.

In the winter, the films formed by the sprays not only provide effective insulating coverings but tend to absorb moisture. When excessive moisture is absorbed, the insulating properties decrease but a compensating effect is attained. When it is sufficiently cold to freeze crops, the moisture absorbed by the films is drawn outwardly to freeze on the surfaces of the films and, in doing so, gives off the heat of crystallization. To such extent and to the extent of the insulation provided, the covered crops are protected from low temperatures. Such protection has been found to be effective in saving crops of oranges, lemons, grapefruit, avocados, and the like from otherwise killing frosts.

Each of the examples given has approximately the same protective effect. At environmental temperatures of 95° F., the surface temperatures of the covered areas are lowered approximately 4° F. At environmental temperatures of 116° F., the surface temperatures of the covered areas are lowered approximately 8° F. Such temperature reduction, though small, permits great savings. Conversely, the sprays raise the temperatures of plant areas covered by approximately 4° F. when the environmental temperatures are from 0° F. to 28° F.

While the instant invention is described in terms of particular ingredients, and ranges thereof, to be used, it is obvious that many modifications and variations in the nature and proportions of the ingredients may be made without departing from the spirit and scope of the invention, and only such limitations should be imposed as are indicated in the appended claims.

Having described our invention, what we claim as new and desire to secure by Letters Patent is:

1. A porous, water soluble, moisture absorbent, temperature control spray for protecting agricultural crops from sun and frost damage while permitting transpiration and plant growth consisting of an intimate mixture containing hydrated lime as a fungicide and heat reflecting agent, from about 15% to 50% by weight of bentonite as an adhesive, from about 20% to 65% by weight clay bulking agent, and water in an amount sufficient to permit spray application of the mixture, the lime being present in at least about 15% to 33⅓% by dry weight of the materials involved.

2. The spray of claim 1 in which the clay bulking agent is kaolin.

3. A porous, water soluble, moisture absorbent temperature control spray for protecting agricultural crops from sun and frost damage consisting of an intimate mixture containing by weight 20 parts hydrated lime, 40 parts bentonite, 20 parts kaolin, 20 parts Celite, and water in an amount sufficient to permit spray application of the mixture.

References Cited in the file of this patent

UNITED STATES PATENTS

| 1,425,257 | Hockridge | Aug. 8, 1922 |
| 1,995,853 | Hunsaker | Mar. 26, 1935 |
| 2,013,063 | Miller | Sept. 3, 1935 |
| 2,203,274 | Anderson et al. | June 4, 1940 |

OTHER REFERENCES

California Agricultural Extension Service Circular 98, March 1936, "Peach and Nectarine Growing in California," by Guy L. Philp et al., published by the College of Agriculture, University of California, Berkeley, California.